United States Patent [19]

Hehl

[11] Patent Number: 5,486,106
[45] Date of Patent: Jan. 23, 1996

[54] HYDRAULIC DEVICE FOR SUPPLYING A HYDRAULIC DRIVING UNIT

[76] Inventor: Karl Hehl, Arthur-Hehl-Str. 32, D-72290 Lossburg, Germany

[21] Appl. No.: 321,893

[22] Filed: Oct. 14, 1994

[30] Foreign Application Priority Data

Oct. 18, 1993 [DE] Germany ............... 43 35 403.3

[51] Int. Cl.$^6$ .................................... B29C 45/80
[52] U.S. Cl. .................... 425/145; 264/40.5; 425/150
[58] Field of Search ................................. 425/145, 150, 425/135; 264/40.5

[56] References Cited

U.S. PATENT DOCUMENTS 5,186,954  2/1993  Miyahara et al. ................ 425/145
5,266,247  11/1993  Yokota .......................... 425/145

FOREIGN PATENT DOCUMENTS 3119095  9/1983  Germany.
3919823  12/1990  Germany.

Primary Examiner—Tim Heitbrink
Attorney, Agent, or Firm—Spencer, Frank & Schneider

[57] ABSTRACT

In a hydraulic device a variable capacity pump adapted to record a differential pressure via a control valve is actuated in such a way that a constant operational pressure gradient is maintained. Since the variable capacity pump is driven by a rotary current motor, which is connected to a current source by a frequency converter and is regulable with regard to its speed, it is possible to control hydraulic consumers in an energy-saving manner at a reasonable price.

5 Claims, 2 Drawing Sheets

HYDRAULIC DEVICE FOR SUPPLYING A HYDRAULIC DRIVING UNIT

CROSSREFERENCE TO RELATED APPLICATION

This application claims the priority of German Patent Application P 43 35 403.3, filed Oct. 18, 1993.

BACKGROUND OF THE INVENTION

1. Field of the Invention

This invention relates to a hydraulic device for supplying a hydraulic driving unit in an injection molding machine for processing synthetic materials comprising at least one variable capacity pump, a main line extending from the variable capacity pump to the driving unit, at least one control valve arranged in the main line and adapted to determine a quantity and a pressure, a control conduit which connects a controlling mechanism of the variable capacity pump with the main line downstream of the control valve, as well as at least one pressure transducing means arranged for transducing an actual pressure value downstream of the control valve, comparing means for comparing a nominal pressure value and supplying a first correcting variable for the controlling mechanism in dependency of result of the comparing means.

2. Description of the Prior Art

A hydraulic device of this kind for a hydraulic circuit of an injection molding machine for processing synthetic materials is known from German Patent 31 19 095. In this hydraulic device the volume flow requirement is adapted in an energetically favourable way to the consumer by a pressure-current regulated variable displacement pump and a control valve which is applied as adjustable ring spinner. To this end a control conduit measures the pressure downstream of the control valve, which leads the volume flow to the consumer and supplies this value as input quantity to the controlling mechanism. This input quantity is increased by a preset operational pressure gradient, so that the pressure drop is maintained constant via the control valve. The pump is run with maximum power during the whole operating time, so that even in those cycle parts in which no large volume quantities have to be delivered, a large leakage occurs in the pump region. Moreover the maximum speed of the pump has to be in derivative action over the complete operating time.

According to German Published Application 39 19 823 the hydraulic consumers (21,22) in a hydraulic device are connected with pumps (311,321), which are driven via A.C. servomotors. Since no hydraulic control elements are used for regulation between the pumps and the hydraulic consumers, these systems work according to the principle of hydrostatic gearings. The speed control is effected by variation of the motor speed. By this measure a low-energy and noise-optimized operating method of the consumers can be achieved. The disadvantage in this device is the relatively expensive A.C. servomotors, which is, however, consciously accepted.

SUMMARY OF THE INVENTION

It is an object of the invention so to design a hydraulic device, which is of the kind described first hereinbefore, that makes possible an energy saving control of the consumers at a reasonable price.

That object is accomplished in accordance with the invention in that the variable capacity pump is driven by a rotary current motor, which is connected to a current source, wherein a speed of rotation of the rotary current motor is regulable via a frequency converter arranged between the current source and the rotary current motor.

Extensive tests in practical operations have shown that the no-load loss of variable displacement pumps decreases noticeably at low speed of the pump. In zero lifting operation, i.e the pump delivers only a low flow rate in order to maintain the set system pressure, the no-load driving power at 500 revolutions per minute is reduced by approx. 50%. By actuating a variable displacement pump via a variable driving speed of rotation it is made possible to take advantage of the reasonable price of such a variable displacement pump and nevertheless to save energy due to the variation of the driving speed of rotation.

Contrary to the expensive rotary current servomotors the driving speed is controlled by a cheap standard current synchronous motor, the speed of which is controlled by a frequency converter. The required nominal value for the speed is calculated by the superset control from the programmed speed profiles and the actual pump pressure value. During the injection operation the power consumption of the motor is reduced by approximately 20 to 35% at average shot quantity.

Contrary to a rotary current servomotor the pumping capacity cannot be reduced to zero, however, this is not absolutely necessary, since always a minimum pressure has to be kept up for the hydraulic system.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not necessarily be construed as limiting the inventive concept to any particular physical configuration.

Figure 1:
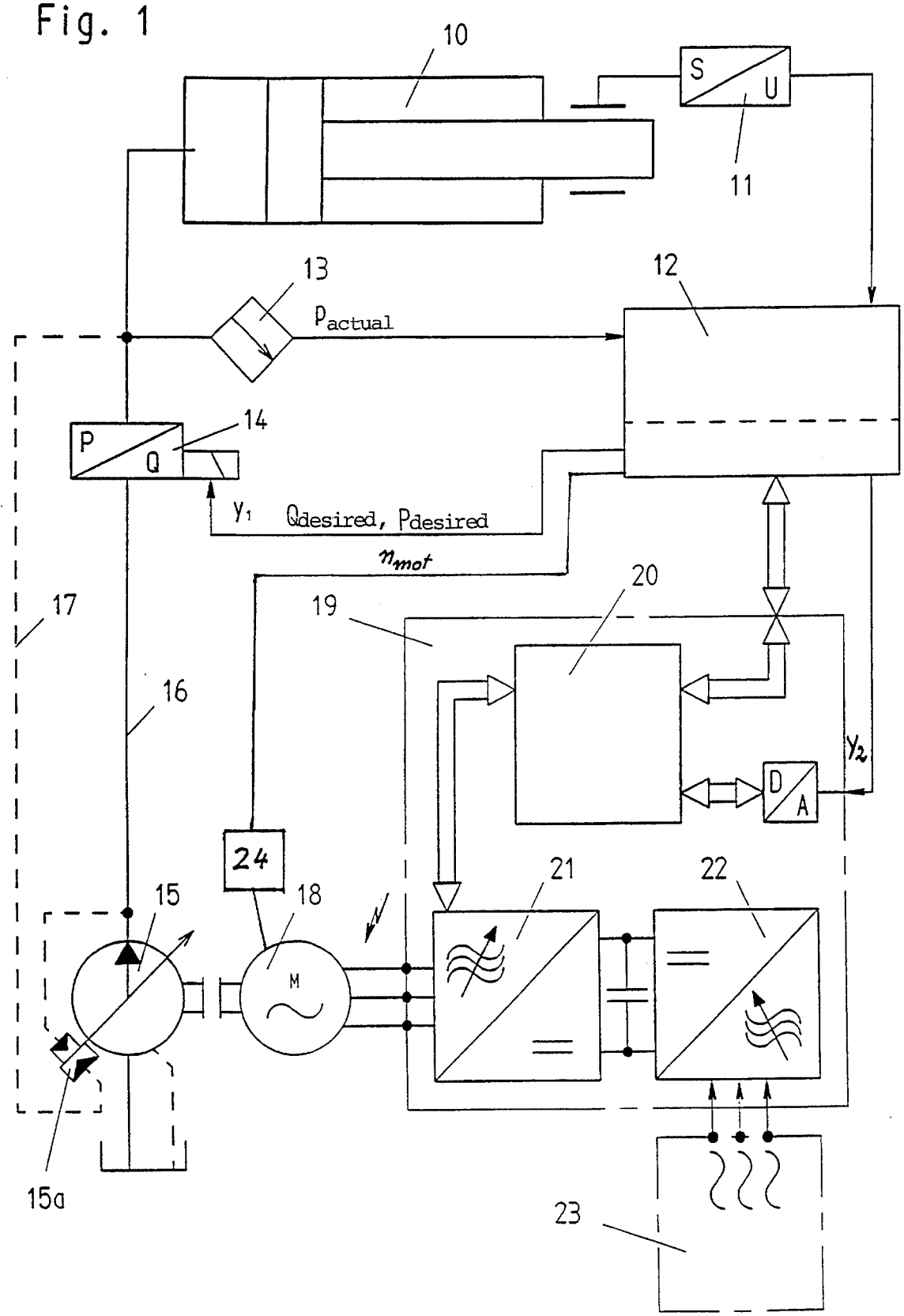
FIG. 1 is a schematic representation of the hydraulic circuit.

FIG. 1 shows a driving unit 10, for example a piston-cylinder unit of an injection molding machine for processing synthetic materials. This driving unit is supplied with hydraulic fluid by a variable capacity pump 15 via the main line 16 and a proportional flow control valve controls the flow of the hydraulic fluid to the driving unit 10. This valve 14 is adjusted by a control 12 via a first correcting variable y1. This first correcting variable y1 corresponds to preset nominal values regarding the quantity (Qsoll) and the pressure (Psoll). The actual position of the driving unit 10 is captured by a section voltage transformer 11, which also transmits a corresponding signal to the control system 12.

The pressure downstream of the control valve 14 is recorded as an actual pressurevalue by the control conduit 17 and is supplied to the controlling mechanism 15a of the variable capacity pump 15. At the same time the pressure upstream of the control valve 14 is recorded, so that by means of these two values a constant operational pressure gradient can be maintained, provided the variable capacity pump is adjusted with a preset value. The variable capacity pump can be engaged in closed or open loop. This allows to quickly follow-up the whole system to varying conditions. The pressure in the main line 16 downstream of the control valve 14 is also transmitted via a pressure transducer 13 as actual pressure value Pist to the control. The variable capacity pump 15 is driven by a rotary current motor 18 or a three-phase current motor. This rotary current motor is connected to a current source via a frequency converter 19, which modulates the current frequency in a certain region, usually between 10 and 50 Hertz. The control system 12 is in communication with the controller 20 of the frequency converter 19. Due to preset values for the injection cycle or parts of an injection cycle a second correcting variable y2 is delivered from the control system 12 via the digital-analog-converter to the controller 20. The controller 20 transmits a corresponding instruction to the frequency regulator 21 for the rotary current motor 18. The frequency regulator 21 itself is provided with energy directly from the switch cabinet 23 via three phases and from a current source. The switch cabinet 23 is connected with the frequency regulator via an intermediate circuit 22, which can also serve as capacitive buffer when the motor speed is reduced or accelerated.

Figure 2:
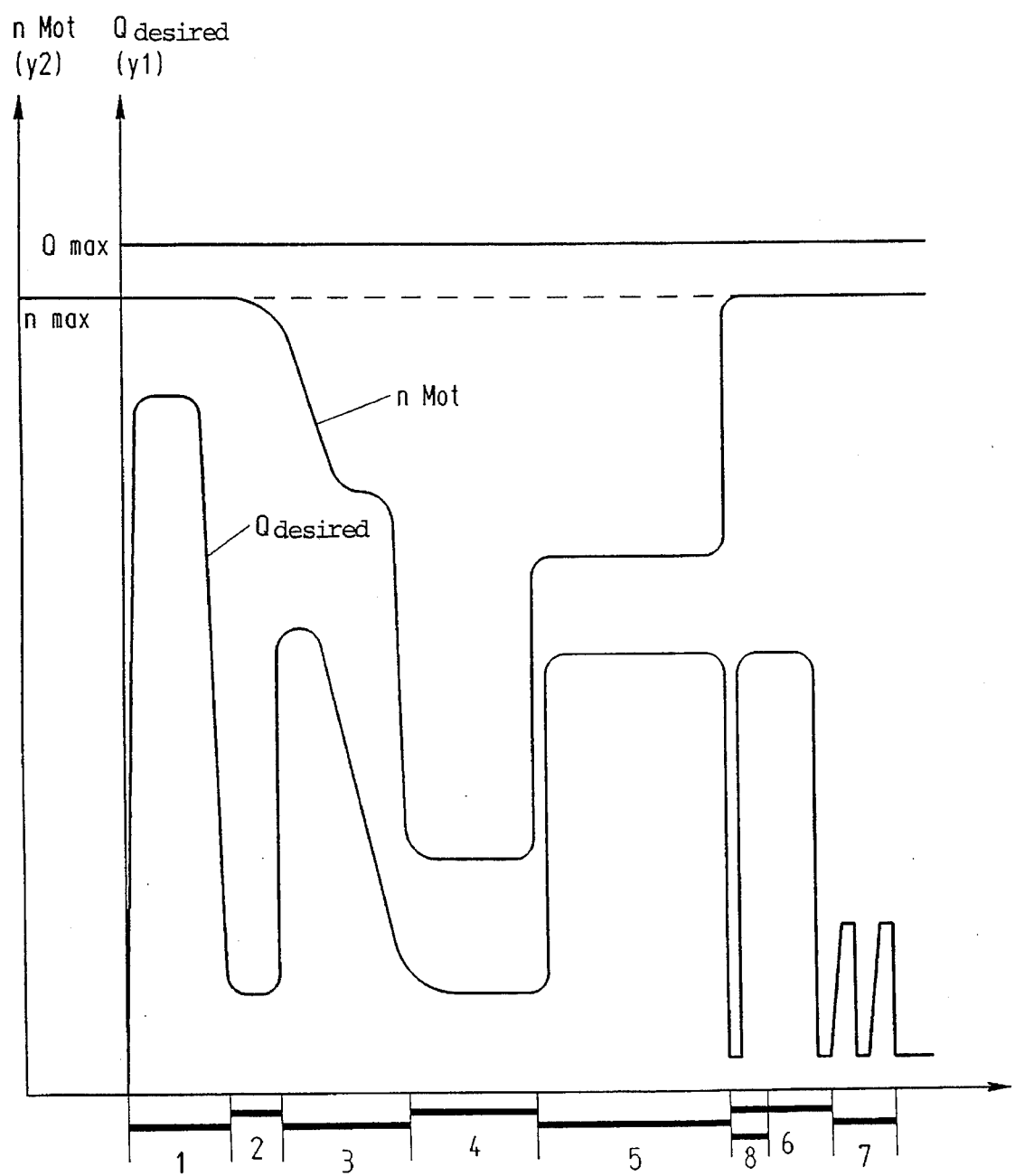
FIG. 2 is a schematic representation of an example of an injection cycle.

Basically the function principle of the hydraulic device is that the maximum pumping capacity, depending on the preset values for the respective injection cycle, is reduced to the maximum capacity required for the individual injection cycle or for a part of this cycle, as can be seen from FIG. 2. The frequency converter takes action in this part. The pressure changes required afterwards i.e. during the individual sequences are largely realized by following-up the operational pressure gradient in a way as described in German Patent 31 19 095. FIG. 2 represents an example of an injection cycle in which the nominal value for the quantity Qsoll corresponding to the first correcting variable y1 and nmot corresponding to the second correcting variable y2 are outlined over the time. In addition the values Qmax and nmax corresponding to the maximum capacity are laid off, too. The numbers outlined on the coordinate stand for the individual parts of the injection cycle. They mean:

1 close mold
2 advance plasticizing unit
3 injection
4 dwell pressure phase
5 proportioning
6 open mold
7 ejection movement
8 retract plasticizing unit If the corresponding motor speed nmot for each at least required maximum power drops below the minimum value, the remaining regulation is as far as possible controlled in cooperation between the control conduit 17 and the controlling mechanism 15a. Whereas for the most parts of an injection cycle at least low savings compared with the maximum power of the pump are apparent, it is very clear that for instance during the proportioning 5 and during the dwell pressure phase 4 the motor speed nmot is considerably reduced resulting in a correspondingly lower energy consumption.

In order to increase the dynamic of the whole system in case necessary and thus possibly increase the influence of the second correcting variable y2 on the total sequence even more, an engine speed sensor 24 can caliper the number of revolutions of the rotary current motor 18 and supply this number as input quantity to the control, so that the number of revolutions is cascadely controlled by the frequency converter. In this moment the importance of the first correcting variable y1 decreases even more.

The variable capacity pump 15 is also superimposed by a rotary current motor regulable with regard to its speed in form of a cascade control.

I claim:

1. A hydraulic device for supplying a hydraulic driving unit in an injection molding machine for processing synthetic materials comprising at least one variable capacity pump, a main line extending from said variable capacity pump to said driving unit, at least one control valve arranged in said main line and adapted to determine a quantity and a pressure of hydraulic fluid in said main line, a controlling mechanism connected with said variable capacity pump for control of said pressure, a control conduit which connects said controlling mechanism of said variable capacity pump with said main line downstream of said control valve, at least one pressure transducing means arranged for transducing an actual pressure value downstream of said control valve; comparing means for comparing said actual pressure value with a nominal pressure value and supplying a first correcting variable for said controlling mechanism in dependency of result of said comparing means, said variable capacity pump being driven by a rotary current motor which is connected to a current source, and a speed of rotation of said rotary current motors being regulated via a frequency converter arranged between said current source and said rotary current motor.

2. The hydraulic device set forth in claim 1, wherein a maximum performance of said variable capacity pump is given by said frequency converter, based on preset values for a respective injection cycle in dependance from a second correcting variable which depends on said quantity and said pressure.

3. The hydraulic device set forth in claim 2, wherein said second correcting variable is separately calculated for individual sections of said injection cycle.

4. The hydraulic device set forth in claim 2, wherein a pumping capacity beyond said maximum performance of said variable capacity pump is regulated by said first correcting variable.

5. The hydraulic device set forth in claim 1, wherein an engine speed sensor calipers a number of revolutions of said rotary current motor and said number of revolutions is cascadely controlled via said frequency converter.

* * * * *